(12) United States Patent
Shin

(10) Patent No.: US 11,188,063 B2
(45) Date of Patent: Nov. 30, 2021

(54) SYSTEM FOR CONTROLLING MANUFACTURING OF DOOR AND METHOD THEREOF FOR VEHICLE

(71) Applicants: Hyundai Motor Company, Seoul (KR); Kia Motors Corporation, Seoul (KR)

(72) Inventor: Chunse Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 72 days.

(21) Appl. No.: 16/699,941

(22) Filed: Dec. 2, 2019

(65) Prior Publication Data

US 2020/0348655 A1    Nov. 5, 2020

(30) Foreign Application Priority Data

Apr. 30, 2019  (KR) .................. 10-2019-0050705

(51) Int. Cl.
  *G05B 19/418* (2006.01)
  *B62D 65/06* (2006.01)
(52) U.S. Cl.
  CPC ....... *G05B 19/41875* (2013.01); *B62D 65/06* (2013.01); *G05B 19/4188* (2013.01); *G05B 19/41805* (2013.01)
(58) Field of Classification Search
  CPC .......... G05B 19/41875; G05B 19/4188; G05B 19/41805; B62D 65/06; B62D 65/028
  USPC ....................................................... 700/109
  See application file for complete search history.

(56) References Cited

U.S. PATENT DOCUMENTS

| 6,081,654 | A | * | 6/2000 | Morman | G06F 30/15 |
| | | | | | 703/1 |
| 2008/0303307 | A1 | * | 12/2008 | Savoy | B60J 5/04 |
| | | | | | 296/146.11 |
| 2012/0163948 | A1 | * | 6/2012 | Asamizu | B62D 65/06 |
| | | | | | 414/590 |
| 2014/0165360 | A1 | * | 6/2014 | Mangiarino | B62D 65/06 |
| | | | | | 29/407.1 |

(Continued)

FOREIGN PATENT DOCUMENTS

| JP | 2014233995 A | * | 12/2014 |
| JP | WO2020170979 A1 | * | 8/2020 |
| KR | 10-1416418 | * | 7/2014 |

*Primary Examiner* — Hien D Khuu
(74) *Attorney, Agent, or Firm* — Mintz Levin Cohn Ferris Glovsky and Popeo, P.C.; Peter F. Corless

(57) ABSTRACT

A system for controlling manufacturing of a vehicle door can set a position of the door by predicting a deflection thereof. The system includes a control unit detecting weight data of the door by vehicle model and position range data, generating a door deflection amount and a body deflection amount based on the weight data and the position range data, detecting a gap prediction value and a step difference prediction value according to the door deflection amount and the body deflection amount, and generating a result list including positioning data of the hinge unit if the gap prediction value and the step difference prediction value exist within a quality reference range, and a prediction unit configured to predict the gap prediction value and the step difference prediction value at which the body and the door are spaced apart based on the door deflection amount and the body deflection amount.

16 Claims, 4 Drawing Sheets

(56) References Cited

U.S. PATENT DOCUMENTS

2014/0366394 A1* 12/2014 Han .................. G01B 5/25
33/600
2016/0123057 A1* 5/2016 Mildner ................ B60J 5/0431
296/146.11

* cited by examiner

SYSTEM FOR CONTROLLING MANUFACTURING OF DOOR AND METHOD THEREOF FOR VEHICLE

CROSS-REFERENCE TO RELATED APPLICATION

This application claims under 35 U.S.C. § 119(a) the benefit of Korean Patent Application No. 10-2019-0050705 filed in the Korean Intellectual Property Office on Apr. 30, 2019, the entire contents of which are incorporated herein by reference.

BACKGROUND

(a) Technical Field

The present disclosure relates to a system and method for controlling manufacturing of a door for a vehicle, more particularly, to the system in which a position of the door can be set by predicting a deflection of the door.

(b) Description of the Related Art

Generally, a vehicle is manufactured by numerous assembling processes using about 20,000 to 30,000 parts.

A process for producing the vehicle is divided into a press process, a body process, a painting process and an assembly process.

That is, a vehicle body is formed by a first assembling process such that vehicle body panels are produced in the press process, and parts such as a hood, a door, and a trunk are then assembled in a vehicle body factory to form the vehicle body of a body-in-white (BIW) state.

Then, a side panel, a roof panel, a rear panel, and the like are transferred to a design process along a body transfer line, and after the painting process is completed, the vehicle is completed by assembling and installing various convenient devices together with an engine, a transmission, and interior and exterior materials.

In particular, the door is installed at each of upper and lower parts inside the vehicle body so as to rotate through a hinge pin. The door is completed after a panel is mounted to the vehicle body by a hinge in the body process, and then equipment such as glass and a handle are installed in manufacturing the vehicle body.

When the door is mounted on the vehicle body through the hinge, the weight of the door causes a hinge body to sag on the vehicle body and the door. To prevent this, the hinge may be mounted upward in consideration of the weight of the panel and the weight of the parts included in the door.

In a conventional case, since a distance and a step between the door and the vehicle body cannot be predicted, the operator repeatedly works on positions of upper and lower ends of the hinge to determine an optimal position of the door, and then installs it.

Accordingly, in the conventional case, since the operator mounted the door while directly changing the position of the hinge, significant time is consumed and a problem of deterioration in quality may occur.

The above information disclosed in this Background section is only for enhancement of understanding of the background of the disclosure and therefore it may contain information that does not form the prior art that is already known in this country to a person of ordinary skill in the art.

SUMMARY

The present disclosure provides a system for controlling manufacturing of door and a method thereof for a vehicle in which a position of the door can be set by predicting a deflection of the door.

Further, an exemplary embodiment of the present disclosure provides a system for controlling manufacturing of the door and a method thereof for a vehicle in which the door can be mounted on the vehicle body by predicting a gap and a step of the door.

A system for controlling manufacturing of a door for a vehicle according to an exemplary embodiment of the present disclosure includes a control unit detecting weight data of the door by vehicle model and position range data, the door being mounted by a hinge unit that connects the door and a body of the vehicle, generating a door deflection amount and a body deflection amount based on the weight data and the position range data, detecting a gap prediction value and a step difference prediction value according to the door deflection amount and the body deflection amount, and generating a result list including a positioning data of the hinge unit if the gap prediction value and the step difference prediction value exist within a quality reference range, and a prediction unit including a plurality of predictors configured to predict the gap prediction value and the step difference prediction value at which the body and the door are spaced apart based on the door deflection amount and the body deflection amount.

Further, the control unit may include a generating unit generating a first door deflection amount and a first body deflection amount according to the weight data and generating a second door deflection amount and a second body deflection amount according to a predetermined position value which is one position value included in the position range data, a quality detecting unit which receives the gap prediction value and the step difference prediction value according to the first door deflection amount, the first body deflection amount, the second door deflection amount, and the second body deflection amount from the prediction unit, determines whether each of the gap prediction value and the step difference prediction value exists in the gap reference range and the step reference range of the quality reference, and generates a quality index using the gap prediction value and the step difference prediction value if each of the gap prediction value and the step difference prediction value exists within the gap reference range and the step reference range of the quality reference range, and a controller configured to set the predetermined position value as positioning data if the gap prediction value and the step difference prediction value exist within the quality reference range, and generate a result list by matching the quality index and the positioning data.

Further, the generating unit may detect the hinge position range data and the bracket position range data for the hinge and the bracket of the hinge unit, and generate a second door deflection amount and a second body deflection amount according to a hinge position setting value included in the hinge position range data and a bracket position setting value included in the bracket position range data.

Further, the generating unit may detect an initial position value and a final position value included in the position range data, change the setting position value by increasing the initial position value starting from the initial position value by the setting unit, and generate a second door deflection amount and a second body deflection amount according to the changed predetermined position value.

Further, the controller may detect a plurality of predetermined position values at which the gap prediction value and the step difference prediction value exist within a quality reference range, set each of the plurality of predetermined position values as positioning data, detect the quality index according to each of the plurality of positioning data, match the positioning data for each of the plurality of quality index, and generate a result table by sorting based on the quality index.

Further, the quality detecting unit may detect a plurality of gap prediction values and step difference prediction values provided from each of the plurality of predictors, determine whether each of the plurality of gap prediction values and the step difference prediction values exists within the gap reference range and the step reference range of the quality reference range, and generate a quality index by using the gap prediction value, the gap reference value, the step difference prediction value, and the step reference value when both the plurality of gap prediction values and the step difference prediction value exist within the quality reference range.

Further, the prediction unit may include a predictor generating a gap prediction value and a step difference prediction value by predicting a gap and a step using a door deflection amount and a body deflection amount for each of a plurality of points positioned at predetermined gaps along a contact portion where the edge of the door and one side of the body contact each other based on the vehicle shape data indicating the shape of the door and the body.

Further, the system for controlling manufacturing of the door for the vehicle may further include a display unit for displaying the result list.

Further, a method for controlling manufacturing of a door for a vehicle (e.g., by a system for controlling manufacturing of the door for the vehicle) according to another exemplary embodiment of the present disclosure includes detecting weight data of a door by vehicle type, and position range data of the hinge unit that connects the doors and the body of the vehicle, generating a door deflection amount and a body deflection amount based on the weight data and the position range data, detecting a gap prediction value and a step difference prediction value according to the door deflection amount and the body deflection amount, determining whether the gap prediction value and the step difference prediction value exist within a quality reference range, and generating a result list including the positioning data of the hinge unit if the gap prediction value and the step difference prediction value exist within a quality reference range.

According to an exemplary embodiment of the present disclosure, the door position can be set by predicting the deflection of the door in advance, thereby improving the production quality of the vehicle.

Further, the doors can be mounted on the vehicle body by predicting the gaps and steps of the doors in advance, thereby reducing production costs and production time.

In addition, the effects that can be obtained or predicted by the embodiments of the present disclosure will be disclosed directly or implicitly in the detailed description of the embodiments of the present disclosure. That is, various effects predicted according to an embodiment of the present disclosure will be disclosed in the detailed description to be described later.

DETAILED DESCRIPTION OF THE EMBODIMENTS

Figure 1:
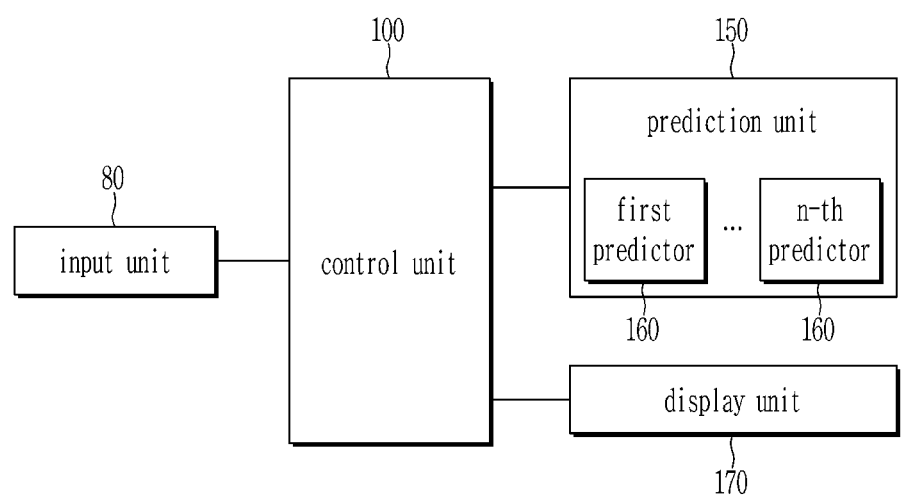
FIG. 1 is a block diagram showing a system for controlling manufacturing of a door for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The operation principles of a system for controlling manufacturing of door and method thereof for vehicle according an exemplary embodiment of the present disclosure will be described hereafter with reference to the accompanying drawings. However, the drawings to be described below and the following detailed description relate to one preferred exemplary embodiment of various exemplary embodiments for effectively explaining the characteristics of the present disclosure. Therefore, the present disclosure should not be construed as being limited to the drawings and the following description.

Further, in the description of the present disclosure, the detailed description of related well-known configurations and functions is not provided, when it is determined as unnecessarily making the scope of the present disclosure unclear. Further, the terminologies to be described below are ones defined in consideration of their function in the present disclosure and may be changed by the intention of a user or an operator or a custom. Therefore, their definition should be determined on the basis of the description of the present disclosure.

Further, in the following exemplary embodiments, the terminologies are appropriately changed, combined, or divided so that those skilled in the art can clearly understand them, in order to efficiently explain the main technical characteristics of the present disclosure, but the present disclosure is not limited thereto.

Hereinafter, exemplary embodiments of the present disclosure will be described in detail with reference to the accompanying drawings.

Figure 2:
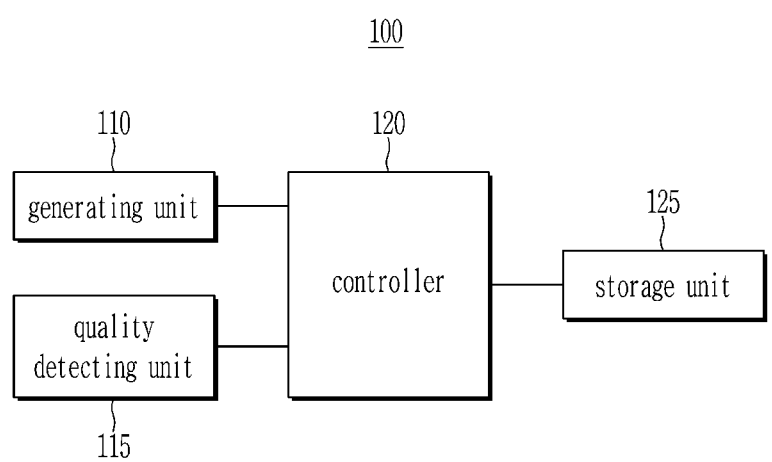
FIG. 2 is a block diagram showing a control unit of a system for controlling manufacturing of the door for the vehicle according to an exemplary embodiment of the present disclosure.
Figure 3:
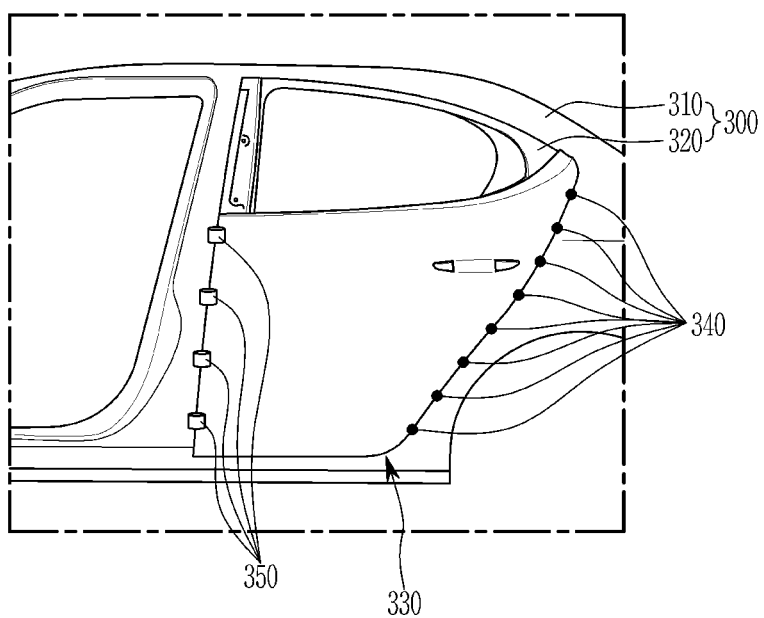
FIG. 3 is an exemplary view for explaining a prediction unit of a system for controlling manufacturing of the door for the vehicle according to an exemplary embodiment of the present disclosure.

FIG. 1 is a block diagram showing a system for controlling manufacturing of a door for a vehicle according to an exemplary embodiment of the present disclosure, FIG. 2 is a block diagram showing a control unit of a system for controlling manufacturing of the door for the vehicle according to an exemplary embodiment of the present disclosure, and FIG. 3 is an exemplary view for explaining a prediction unit of a system for controlling manufacturing of the door for the vehicle according to an exemplary embodiment of the present disclosure.

Referring to FIG. 1, a system for controlling manufacturing of a door for a vehicle according to the present disclosure includes an input unit 80, a control unit 100, a prediction unit 150, and a display unit 170.

The input unit 80 receives data necessary for a system for controlling manufacturing of the door for the vehicle. The input unit 80 receives vehicle identification data. That is, the input unit 80 may receive vehicle identification data directly from an operator or through a barcode attached to the vehicle body. Here, the vehicle identification data is data for identifying the vehicle and may be indicated through numbers or letters. The barcode may consist of a one-dimensional barcode or a two-dimensional barcode. The two-dimensional barcode may be one of a quick response (QR) code, a maxi code, a data matrix code, and a PDF417.

In addition, the input unit 80 may receive the position range data of the hinge unit from the operator. The hinge unit is a component for connecting the body and the door of the vehicle body, and may include a hinge and a bracket. The position range data may indicate a range of positions in which the hinge unit may be mounted in the body and the door of the vehicle body.

The input unit 80 may receive data from a user using any letter (or number, special symbol, etc.) through a keypad displayed through the display unit 170 or a separately arranged keypad.

The control unit 100 generates a door deflection amount and a body deflection amount based on the weight data and the position range data, detects a gap prediction value and a step difference prediction value according to the door deflection amount and the body deflection amount, and generates a result list according to the gap prediction value and the step difference prediction value.

As shown in FIG. 2, the control unit 100 preferably includes a generating unit 110, a quality detecting unit 115, a controller 120 and a storage unit 125.

The generating unit 110 generates a door deflection amount and a body deflection amount according to the weight data and the position range data. In particular, the generating unit 110 detects the weight data based on the vehicle identification data. In this case, the weight data indicates the weight of the door, and may include the weight of the panel and optionally, design specifications of the door, and the design specifications may indicate the parts necessary for the door except equipment such as glass and a handle.

The generating unit 110 generates a first door deflection amount and a first body deflection amount according to the weight data. In this case, the first door deflection amount may indicate a degree of deflection of the door contacting the hinge unit according to the weight of the door, and the first body deflection amount may indicate a degree of deflection of the body in contact with the hinge unit according to the weight of the door.

The generating unit 110 detects the position range data including the hinge position range data and the bracket position range data. The position range data may be input from an operator through the input unit 80 or data stored in the storage unit 125.

The generating unit 110 selects one position from the hinge position range data and sets the selected position value as the hinge setting position value. The generating unit 110 selects one position from the bracket position range data, and sets the selected position value as the bracket setting position value.

The generating unit 110 generates a second door deflection amount and a second body deflection amount according to the hinge setting position value and the bracket setting position value. In this case, the second door deflection amount may indicate the degree of deflection of the door contacting the hinge unit according to the position of the hinge and the bracket, and the second body deflection amount may indicate a degree of deflection of the body contacting the hinge unit according to the position of the hinge and the bracket.

The quality detecting unit 115 receives the gap prediction value and the step difference prediction value from the prediction unit 150. In this case, the gap prediction value may indicate a value for estimating the distance between the body and the door in the vehicle longitudinal direction, and the step difference prediction value may indicate a value for estimating the distance between the body and the door in the vehicle width direction. The gap prediction value and the step difference prediction value may be expressed in units of mm.

The quality detecting unit 115 determines whether the gap prediction value and the step difference prediction value exist within the quality reference range. In this case, the quality reference range may be a range predetermined in advance as a reference set to improve the quality of the vehicle. This quality reference range may be predetermined by an operator or through a predetermined algorithm (e.g., a program and a probability model).

The quality detecting unit 115 generates a quality index using the gap prediction value and the step difference prediction value when the gap prediction value and the step difference prediction value exist within the quality reference range.

The controller 120 controls the generating unit 110, the quality detecting unit 115, and the storage unit 125, which are components of the control unit 100.

The controller 120 generates a result table when the gap prediction value and the step difference prediction value exist within the quality reference range.

In other words, the controller 120 sets the set position value as the positioning data when the gap prediction value exists in the gap reference range and the step difference prediction value exists in the step reference range, and generates a result table by matching the quality index generated by the quality detecting unit 115 with the positioning data. Here, the positioning data may indicate a position at which the hinge unit is to be mounted to the body and the door of the vehicle body. The positioning data may include positions for each of the two hinge units 350 located at the top and the bottom as shown in FIG. 3.

The storage unit 125 stores information required by the components of the control unit 100 and information generated by the components of the control unit 100.

For example, the storage unit 125 may store weight data and position range data for each vehicle type. The storage unit 125 may store the door deflection amount and the body deflection amount generated by the control unit 100, and may store the result table generated by the control unit 100. The storage unit 125 may store the gap prediction value and the step difference prediction value predicted by the prediction unit 150. The storage unit 125 may store vehicle shape data for each vehicle type.

The storage unit 125 stores various programs for controlling the overall operation of the control unit 100. In addition, the storage unit 125 may provide necessary information at the request of the generating unit 110, the quality detecting unit 115, and the controller 120, which are components of the control unit 100.

The control unit 100 may be implemented as one or more microprocessors operating by a set program. In addition, the set program may include a series of commands for performing each step included in the method for controlling manufacturing of the door for the vehicle according to an embodiment of the present disclosure described below. The method for controlling manufacturing of the door for the vehicle will be described in more detail with reference to FIG. 4.

The prediction unit 150 receives the door deflection amount and the body deflection amount from the control unit 100. The prediction unit 150 detects the vehicle shape data. In this case, the vehicle shape data may represent the shape of each of the body and the door of the vehicle body. For example, as shown in FIG. 3, the vehicle shape data may represent the shapes of the body 310 and the door 320 of the vehicle.

The prediction unit 150 includes a plurality of predictors 160 generating gap prediction values and step difference prediction values based on the door deflection amount and the body deflection amount.

As shown in FIG. 3, the prediction unit 150 includes a plurality of predictors positioned at predetermined gaps along the contact portion 330 where the edge of the door 320 contacts one side of the body 310 based on the vehicle shape data 300. Each of the points 340 includes a plurality of predictors 160 for predicting the gap and step of the body and the door spaced apart. Meanwhile, although eight points 340 are illustrated as an example in FIG. 3, the present disclosure is not limited thereto, and the number of points may be different depending on the type of vehicle, the operator's setting, and the like.

The predictor 160 predicts and generates the gap prediction value and the step difference prediction value at the point using the door deflection amount and the body deflection amount provided from the control unit 100.

The predictor 160 provides the generated gap prediction value and the step difference prediction value to the control unit 100.

The display unit 170 displays data generated during the operation of the system for controlling manufacturing of the door for the vehicle.

For example, the display unit 170 may display a user interface (UI) for receiving data through the input unit 80. The display unit 170 may display the door deflection amount and the body deflection amount generated by the control unit 100. The display unit 170 may display a result table generated by the control unit 100. The display unit 170 may display the gap prediction value and the step difference prediction value output from the prediction unit 150.

The display unit 170 is irrelevant as long as it can display the result table. Meanwhile, although the display unit 170 and the control unit 100 are separately displayed and described as separate devices, the present disclosure is not limited thereto and may be configured as a single device.

Hereinafter, a method for controlling manufacturing of the door for the vehicle will be described with reference to FIG. 4.

Figure 4:
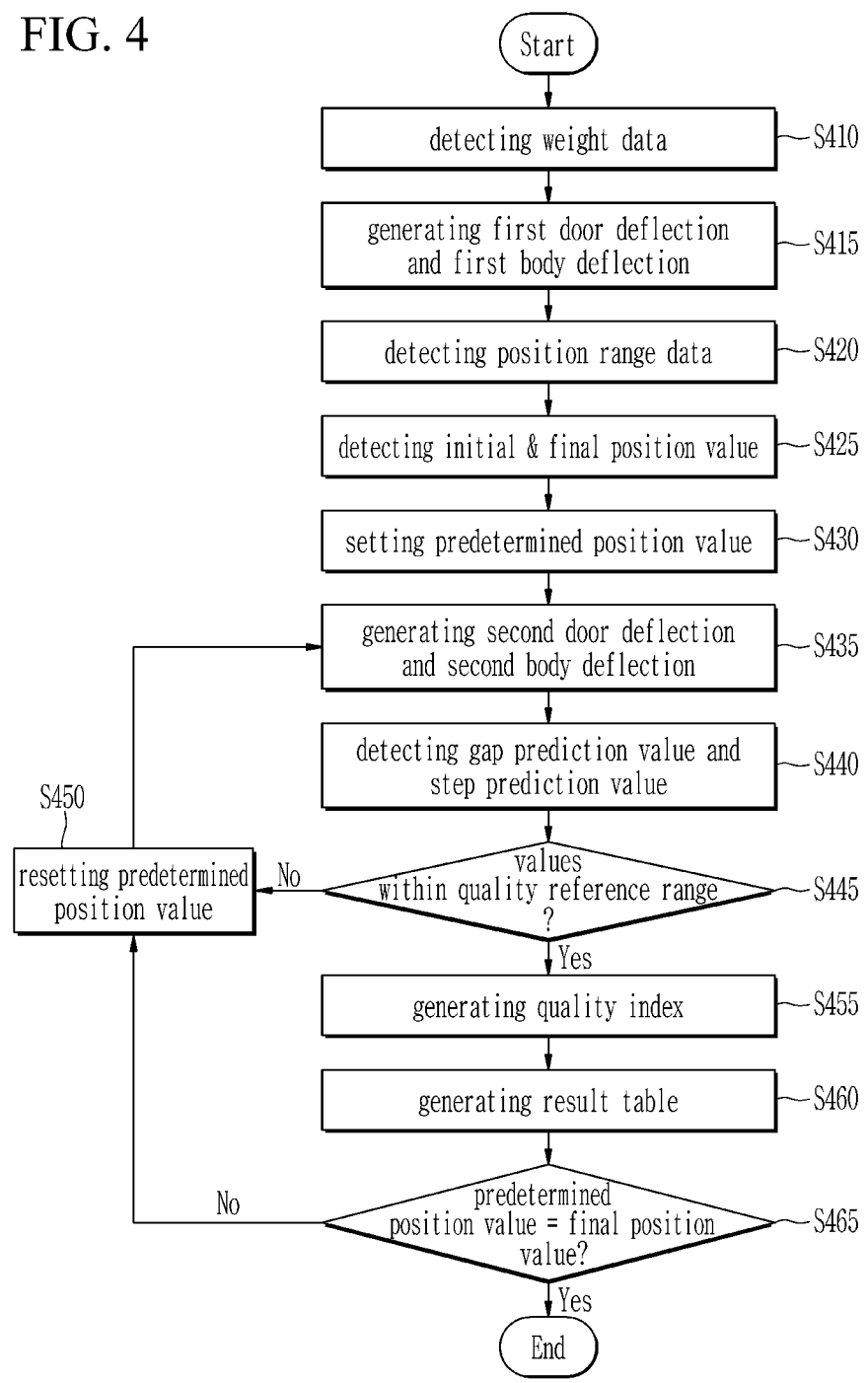
FIG. 4 is a flowchart showing a method for controlling manufacturing of the door for the vehicle according to an exemplary embodiment of the present disclosure.

FIG. 4 is a flowchart showing a method for controlling manufacturing of the door for the vehicle according to an exemplary embodiment of the present disclosure. Earlier, with reference to FIG. 2, each component of the control unit 100 can be integrated or subdivided. Regardless of the corresponding name, it is clarified that a component that performs the above-described functions may be a configuration of the control unit 100. Therefore, in describing the method for controlling manufacturing of the door for the vehicle according to an embodiment of the present disclosure, the main body of each step will be described as the main control unit 100, not the corresponding component.

Referring to FIG. 4, the control unit 100 detects weight data of the door S410. In this case, the control unit 100 may receive and detect the weight data through the operator, or may detect the weight data through the vehicle identification data.

The control unit 100 generates the first door deflection amount and the second body deflection amount according to the weight data of the door S415.

The control unit 100 detects the position range data of the hinge unit S420. In this case, the control unit 100 may receive and detect the position range data on which the hinge unit may be mounted on the body and the door of the vehicle through an operator, or may detect the position range data through the vehicle identification data. Here, the position range data may include hinge position range data for the hinge of the hinge unit and hinge position range data for the bracket.

On the other hand, it is described here for example to detect the position range data after detecting the weight data, but is not limited to this, the weight data may be detected after detecting the position range data, the weight data and the position range data may be detected at the same time.

The control unit 100 detects the initial position value and the final position value included in the position range data S425.

Specifically, the control unit 100 detects the hinge initial position value and the hinge final position value included in the hinge position range data. Here, the hinge initial position value may indicate a position basically set to mount the hinge on the body and the door, and the hinge final position value may indicate the maximum position that can be mounted by moving the hinge to the body and the door.

The control unit 100 detects the bracket initial position value and the bracket final position value included in the bracket position range data. In this case, the bracket initial position value may indicate a position basically set to mount the bracket on the body and the door, and the bracket final position value may indicate the maximum position that can be mounted by moving the bracket on the body and the door.

The control unit 100 sets the set position value using the position range data S430. In other words, the control unit 100 sets the hinge initial position value included in the hinge position range data to the hinge setting position value, and sets the bracket initial position value to the bracket setting position value.

The control unit 100 generates the second door deformation amount and the second body deformation amount using the set position value S435. That is, the control unit 100 generates the second door deformation amount and the second body deformation amount indicating the degree of deformation of the door and the body according to the position of the hinge and the bracket by using the hinge setting position value and the bracket setting position value.

The control unit 100 detects the gap prediction value and the step difference prediction value according to the door deformation amount and the body deformation amount S440.

Specifically, the control unit 100 provides the first door deformation amount, the first body deformation amount, the second door deformation amount, and the second body deformation amount to the prediction unit 150. The prediction unit 150 receives the first door deformation amount, the first body deformation amount, the second door deformation amount, and the second body deformation amount from the control unit 100.

The plurality of predictors 160 included in the prediction unit 150 predict the interval prediction value and the step difference prediction value according to the first door deformation amount, the first body deformation amount, the second door deformation amount, and the second body deformation amount at each of the plurality of points. In this case, the interval predicted value and the step predicted value predicted by each of the plurality of predictors 160 may be different from each other because they predict the interval and the step in which the body and the door are separated from each point.

The prediction unit 150 provides the control unit 100 with the interval prediction value and the step difference prediction value predicted by each of the plurality of predictors 160.

The control unit 100 determines whether the interval prediction value and the step difference prediction value exist within the quality reference range S445. That is, the control unit 100 determines whether the interval prediction value is within the interval quality reference range.

For example, the control unit 100 may determine whether the interval prediction value exists within the interval reference range through [Equation 1].

$$S1<SP<S2 \quad \text{[Equation 1]}$$

Here, S1 may indicate a first reference value included in the interval reference range, SP may indicate an interval prediction value, and S2 may indicate a second reference value included in the interval reference range.

The control unit 100 determines whether the step predicted value exists within the step quality reference range.

On the other hand, the control unit 100 determines whether each of the plurality of interval prediction values exists within the interval reference range, and determines whether each of the plurality of step difference prediction values exists within the step reference range.

For example, the control unit 100 may determine whether the step predicted value exists within the step reference range through [Equation 2].

$$S3<CP<S4 \quad \text{[Equation 2]}$$

Here, S3 may represent a third reference value included in the stepped reference range, CP may represent a stepped prediction value, and S4 may represent a fourth reference value included in the stepped reference range.

The control unit 100 resets the set position value if the interval prediction value and the step difference prediction value do not exist in the quality reference range S450.

That is, the control unit 100 does not exist within the interval reference range even when one of the plurality of interval prediction values does not exist within the interval reference range, or when one of the plurality of step difference prediction values does not exist within the step reference range, the setting set in step S430. The set predicted value is reset by increasing the predicted value by the set unit. The control unit 100 returns to step S435 to perform the subsequent step.

On the other hand, the control unit 100 generates a quality index when the interval prediction value and the step difference prediction value exist within the quality reference range S455.

Specifically, when the control unit 100 has a plurality of interval prediction values exist within the interval reference range, and a plurality of step difference prediction values exist within the step reference range, a quality index is generated using the interval prediction value, the interval reference value, the step difference prediction value, and the step reference value.

That is, the control unit 100 may generate a quality index through Equation 3 below.

$$QI = \sum^{n} \sqrt{(SP-SS)^2 + (CP-CS)^2} \quad \text{[Equation 3]}$$

Here, QI represents a quality index, SP represents an interval prediction value, SS represents an interval reference value, CP represents a step difference prediction value, CS represents a step reference value, and n represents the number of predictors 160. In this case, the interval reference value and the step reference value may be preset as values used as reference values to check quality. The interval reference value and the step reference value may be set by an operator or through a predetermined algorithm (e.g., a program and a probability model).

The control unit 100 generates a result table using the quality index and the set position value S460. In other words, the control unit 100 detects the predetermined position value and sets the predetermined position value as the positioning data. The control unit 100 may set the hinge setting position value to the hinge positioning data and the bracket setting position value to the bracket positioning data.

The control unit 100 matches the hinge positioning data and the bracket positioning data to the quality index to generate a result table.

If the plurality of quality indices are included in the result table, the control unit 100 may reset the result table by sorting based on the quality indices. In particular, the control unit 100 may reset the result table by sorting the quality index in ascending order.

The control unit 100 determines whether the set position value is the same as the final position value S465.

If the set position value is not the same as the final position value, the control unit 100 fails to check all the position values included in the position range data, and returns to step S450 to reset the set position values.

On the other hand, the control unit 100 controls the display unit 170 to display the result table if the set position value is the same as the final position value.

That is, the display unit 170 displays a result table including the positioning data matched with the plurality of quality indices. Then, the operator checks the result table through the display unit 170, selects position data on which the hinge and the bracket can be mounted among the plurality of positioning data included in the result table, and uses the selected position data to control the door production robot to mount the door to the body.

Accordingly, the system for controlling manufacturing of the door for the vehicle according to an embodiment of the present disclosure can provide a mounting position of the hinge and the bracket by predicting the deformation amount of the door and the body in advance before the door is mounted on the body of the vehicle body. This can be improved and saves production time and costs.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A system for controlling manufacturing of a door for a vehicle, comprising:
   one or more microprocessors configured to:
   detect weight data of the door by vehicle model and position range data in which the door is configured to be mounted by a hinge unit that connects the door and a body of the vehicle,
   generate a door deflection amount and a body deflection amount based on the weight data and the position range data,
   detect a gap prediction value and a step difference prediction value according to the door deflection amount and the body deflection amount, and
   generate a result list including a positioning data of the hinge unit if the gap prediction value and the step difference prediction value exist within a quality reference range; and
   a prediction logic including a plurality of predictor models configured to predict the gap prediction value and the step difference prediction value at which the body and the door are spaced apart based on the door deflection amount and the body deflection amount.

2. The system of claim 1, wherein the one or more microprocessors further configures to:
   generate a first door deflection amount and a first body deflection amount according to the weight data and generate a second door deflection amount and a second body deflection amount according to a predetermined position value which is one position value included in the position range data;
   receive the gap prediction value and the step difference prediction value according to the first door deflection amount, the first body deflection amount, the second door deflection amount, and the second body deflection amount from the prediction logic, determine whether each of the gap prediction value and the step difference prediction value exists in the gap reference range and the step reference range of the quality reference, and generate a quality index using the gap prediction value and the step difference prediction value if each of the gap prediction value and the step difference prediction value exists within the gap reference range and the step reference range of the quality reference range; and
   set the predetermined position value as positioning data if the gap prediction value and the step difference prediction value exist within the quality reference range, and generate a result list by matching the quality index and the positioning data.

3. The system of claim 2, wherein: the one or more microprocessors detects the hinge position range data and the bracket position range data for the hinge and the bracket of the hinge unit, and generates a second door deflection amount and a second body deflection amount according to a hinge position setting value included in the hinge position range data and a bracket position setting value included in the bracket position range data.

4. The system of claim 2, wherein: the one or more microprocessors detects an initial position value and a final position value included in the position range data, changes the setting position value by increasing the initial position value starting from the initial position value, and generates a second door deflection amount and a second body deflection amount according to the changed predetermined position value.

5. The system of claim 2, wherein: the one or more microprocessors detects a plurality of predetermined position values at which the gap prediction value and the step difference prediction value exist within a quality reference range, sets each of the plurality of predetermined position values as positioning data, detects the quality index according to each of the plurality of positioning data, matches the positioning data for each of the plurality of quality index, and generates a result table by sorting based on the quality index.

6. The system of claim 2, wherein: the one or more microprocessors detects a plurality of gap prediction values and step difference prediction values provided from each of the plurality of predictor models, determines whether each of the plurality of gap prediction values and the step difference prediction values exists within the gap reference range and the step reference range of the quality reference range, and generates a quality index by using the gap prediction value, the gap reference value, the step difference prediction value, and the step reference value when both the plurality of gap prediction values and the step difference prediction value exist within the quality reference range.

7. The system of claim 1, wherein: the prediction logic includes the plurality of predictor models generating a gap prediction value and a step difference prediction value by predicting a gap and a step using a door deflection amount and a body deflection amount for each of a plurality of points positioned at predetermined gaps along a contact portion where the edge of the door and one side of the body contact each other based on the vehicle shape data indicating the shape of the door and the body.

8. The system of claim 1, further comprising: a display unit for displaying the result list.

9. A method for controlling manufacturing of a door for a vehicle, comprising: detecting weight data of the door by vehicle type, and position range data of a hinge unit that connects the door and a body of the vehicle; generating a door deflection amount and a body deflection amount based on the weight data and the position range data; detecting a gap prediction value and a step difference prediction value according to the door deflection amount and the body deflection amount; determining whether the gap prediction value and the step difference prediction value exist within a quality reference range; and generating a result list including the positioning data of the hinge unit if the gap prediction value and the step difference prediction value exist within a quality reference range.

10. The method of claim 9, wherein generating the door deflection amount and the body deflection amount includes: generating a first door deflection amount and a first body deflection amount according to the weight data; and generating a second door deflection amount and a second body deflection amount according to the position range data.

11. The method of claim 10, wherein generating the second door deflection amount and the second body deflection amount according to the position range data includes: setting one position included in the position range data as a predetermined position value; and generating the second door deflection amount and the second body deflection amount according to the predetermined position value.

12. The method of claim 11, wherein setting the one position included in the position range data as the predetermined position value includes: detecting an initial position value and a final position value included in the position range data; and setting the predetermined position value by increasing the initial position value from the initial position value to the final position value.

13. The method of claim 11, wherein generating the result list includes: setting the predetermined position value as the positioning data if it exists within the quality reference range; and generating the result list comprising the positioning data.

14. The method of claim 11, wherein setting the one position included in the position range data as the predetermined position value includes: detecting hinge position range data for the hinge of the hinge unit and bracket position range data for the bracket of the hinge unit included in the position range data; and setting one position included in the hinge position range data as a hinge setting position value, and setting one position included in the bracket position range data as a bracket setting position value.

15. The method of claim 14, wherein generating the result list includes: setting the hinge setting position value to the hinge position range data and setting the bracket setting position value to the bracket positioning data if they exist within the quality reference range; and generating the result list including the hinge positioning data and the bracket positioning data.

16. The method of claim 9, wherein generating the result list includes: generating a quality index using the gap prediction value, the gap reference value, the step difference prediction value, and the step reference value, if they exist within the quality reference range; and generating the result table by matching the positioning data with the quality index.

* * * * *